United States Patent [19]

Wahl, III

[11] 4,375,153
[45] Mar. 1, 1983

[54] PROCESS AND APPARATUS FOR CONTROL OF TWO-PHASE FLOW TO GEOTHERMAL POWER PLANTS

[76] Inventor: Edward F. Wahl, III, c/o Wahl Company, 2338 Dana Ct., Claremont, Calif. 91711

[21] Appl. No.: 247,898

[22] Filed: Mar. 26, 1981

[51] Int. Cl.[3] .............................................. F03G 7/04
[52] U.S. Cl. ..................................... 60/641.2; 165/45
[58] Field of Search ................. 60/641.2, 641.3, 641.5; 165/45

[56] References Cited

U.S. PATENT DOCUMENTS

| | | | |
|---|---|---|---|
| 3,605,403 | 9/1971 | Aikawa et al. | 60/641.2 |
| 3,757,516 | 9/1973 | McCabe | 60/641.2 |
| 3,782,468 | 1/1974 | Kuwada | 60/641.5 |
| 4,044,830 | 8/1977 | Van Huisen | 165/45 |
| 4,079,590 | 3/1978 | Sheinbaum | 165/45 |
| 4,131,161 | 12/1978 | Lacquement | 166/265 |
| 4,232,992 | 11/1980 | Possell | 60/641.2 |

FOREIGN PATENT DOCUMENTS

| | | | |
|---|---|---|---|
| 55-69711 | 5/1980 | Japan | 60/641.2 |
| 311025 | 10/1971 | U.S.S.R. | 60/641.2 |

Primary Examiner—Sheldon J. Richter
Attorney, Agent, or Firm—Harris, Kern, Wallen & Tinsley

[57] ABSTRACT

Method and apparatus for transmitting a two-phase fluid of water and steam from a geothermal well head to a thermal energy use plant. A pipeline with substantially no flow restrictions and a decoupling tank, with the pipeline directly feeding the tank, and the tank feeding the energy use plant. Several embodiments of a decoupling tank including one with separate steam and water outlets, one with an outlet tube within the tank and an outlet slot in the tube at the water level of the tank, and one with a dumbbell-shaped outlet slot with a narrow central portion at the water level.

8 Claims, 7 Drawing Figures

PROCESS AND APPARATUS FOR CONTROL OF TWO-PHASE FLOW TO GEOTHERMAL POWER PLANTS

BACKGROUND OF THE INVENTION

This invention relates to geothermal wells and in particular, to a new and improved method and apparatus for interconnection of a geothermal well and a thermal energy use plant.

A geothermal well installation typically comprises a well with a well head which provides a two-phase mixture of steam and water (usually brine), a thermal energy use plant such as a chemical process plant or an electric generating plant, and a transmission pipeline linking the well head to the energy use plant. The two-phase mixture often flows in the well and/or the pipeline in slug or other nonuniform flow. This nonhomogeneous or non-steady or pulsing type flow creates problems in the plant and in the pipeline itself. Conventional installations typically have a first stage separator located near the well head, and separately transmit the separated steam and water phases from the separator to the plant. The pressure and flow fluctuations resulting from the instabilities mentioned above are transmitted through the steam and water transmission lines. It is generally recognized that some economy may be achieved by using a single two-phase pipeline to transmit the geothermal fluid from the well head to the plant where the first stage separator is located. In this case the flow instabilities are increased because of pipeline restrictions described in the next paragraph.

It has been found that flow instability of the two-phase fluid in the pipeline between a geothermal well head and an energy use plant is caused and/or increased by restrictions in the line between the well head and the plant or first stage separator. This instability causes what might otherwise be a time-wise steady or uniform two-phase flow condition in the well and pipeline system to become and remain nonsteady or nonuniform. The restrictions may take various forms, such as a control valve or other restricting orifice, a vertical rise or a vertical expansion loop, a change in slope which causes accumulation of liquid, an elbow of relatively short radius which promotes separation of liquid droplets from the gas, and the like.

It is an object of the present invention to provide a new and improved method and apparatus for transmitting two-phase fluid from a geothermal well head to an energy use plant and maintaining homogeneous two-phase flow with a minimum of instabilities. A further object is to provide such a method and apparatus utilizing a pipeline directly connected to the well head and having substantially no flow restrictions in the line.

It has been found that any flow instabilities in the unrestricted pipeline can be further removed by inserting a decoupling tank between the pipeline and the energy use plant, with the decoupling tank providing flow of water and steam to the plant in a substantially steady mode suitable for use at the plant.

Accordingly, it is a further object of the invention to provide such a method and apparatus incorporating a decoupling tank. An additional object of the invention is to provide specific configurations for a decoupling tank. In one configuration the decoupling tank should be as close as practical to the plant whereas in another configuration with single phase output lines it can be as close to the well as practical. However for economy of piping, it may be advantageous to locate the decoupling tank for this latter case also close to the plant.

In the past, it has typically been the practice to position a separator at the well head or at some distance from the well head to separate steam and water, and transmit the steam via a pipeline to the plant, with the water also being transmitted to the plant or returned to the reservoir by a reinjection well or otherwise, as desired. Typically, some form of throttling or flow-control valve is positioned at the well head or in the transmission line to the separator, which usually incorporates elbows, tees, slope changes, vertical risers, vertical expansion loops, and the like, all of which produce instability of flow in the form of water slugs in the steam.

One proposed system in U.S. Pat. No. 3,605,403 shows a pipeline directly connecting the well head to a power station, without describing the pipeline and without incorporating any decoupling tank or other provision for achieving a steady uniform flow in the pipeline.

It is an additional object of the present invention to provide a new method and apparatus for two-phase fluid transmission which is an improvement over that known in the prior art.

Other objects, advantages, features and results will more fully appear in the course of the following description. The drawings merely show and the description merely describes preferred embodiments of the present invention which are given by way of illustration or example.

SUMMARY OF THE INVENTION

The invention includes a method of transmitting a two-phase fluid of water and steam from a geothermal well head to a thermal energy use plant in a manner so as to provide a substantially uniform mixture of water and steam at the plant. The method includes introducing the two-phase fluid from the well head directly into a pipeline having substantially no flow restrictions, conveying the two-phase fluid through the pipeline to a decoupling tank adjacent to the plant, and conveying the water and steam from the tank to the plant.

The invention includes apparatus for connecting a thermal energy use plant to the well head of a geothermal well including a decoupling tank, a means for connecting the decoupling tank outlet to the plant inlet, and a pipeline directly connecting the well head to the tank with the pipeline having substantially no flow restrictions between the well head and the tank. The invention also includes specific configurations for the decoupling tank and for interconnecting the tank and plant.

The invention also includes a geothermal well installation including the well with well head providing the two-phase mixture of steam and water, the energy use plant for using thermal energy from the well, the decoupling tank, means for connecting the tank to the plant, and the pipeline directly connecting the well head to the tank with the pipeline having substantially no flow restrictions.

DESCRIPTION OF THE PREFERRED EMBODIMENTS

Figure 1:
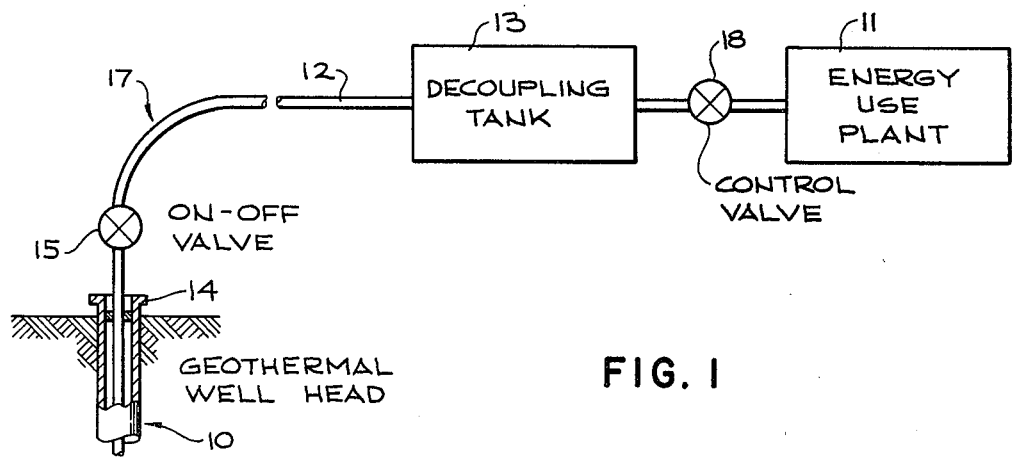
FIG. 1 is a diagram illustrating a geothermal well installation with energy use plant and incorporating the presently preferred embodiment of the invention.

In the installation of FIG. 1, a geothermal well 10 is connected to an energy use plant at 11 by a pipeline 12 and a decoupling tank 13. The pipeline 12 is designed to have no flow restrictions between the well head 14 and the tank 13. An on-off valve 15 may be positioned in the pipeline for shutting off flow from the well. However, during operation, this valve 15 should always be full open so as to provide no flow restriction.

The pipeline should have no throttling valves or other control devices for controlling pressure or rate of flow. Further it is preferred that the pipeline should have no vertical rises or vertical expansion loops, and should have no changes in slope which would permit liquid to accumulate. Elbows and tees should be avoided. Where a change in direction is necessary, a long radius curve should be utilized, as indicated at 17 in FIG. 1. If an expansion loop is desired, it should be placed horizontal or at the slope of the line, utilizing long radius curves. More than one well can be fed to a decoupling tank, but this should be accomplished by means of a Y connection rather than a tee, with appropriate cross-section areas for the incoming and combined flows.

The decoupling tank 13 should be positioned as close as possible to the first unit of the plant 11, and some form of control valve 18 may be utilized between the tank and the plant for flow control. While such a control valve would tend to generate instability in the fluid flow, this valve is so close to the decoupling tank and the pipeline from there to the plant is so short that the undesirable unstable flow does not have an opportunity to develop.

There is always a tendency in a two-phase fluid for the liquid to separate from the vapor or steam. For typical geothermal plant conditions the volumetric flow rate of steam is about 100 times that of water through an orifice with the same pressure drop. Hence, a throttling valve or restriction in the pipeline 12 substantially amplifies any unsteady flow rate between water and steam, producing undesirable periodic flow patterns with slugs of water. In one installation, with an eight-inch diameter pipe from the well and a flow-control valve adjacent the well head providing an orifice, a pulsing flow of slugs of water with a period of about ten seconds results.

Figure 2:
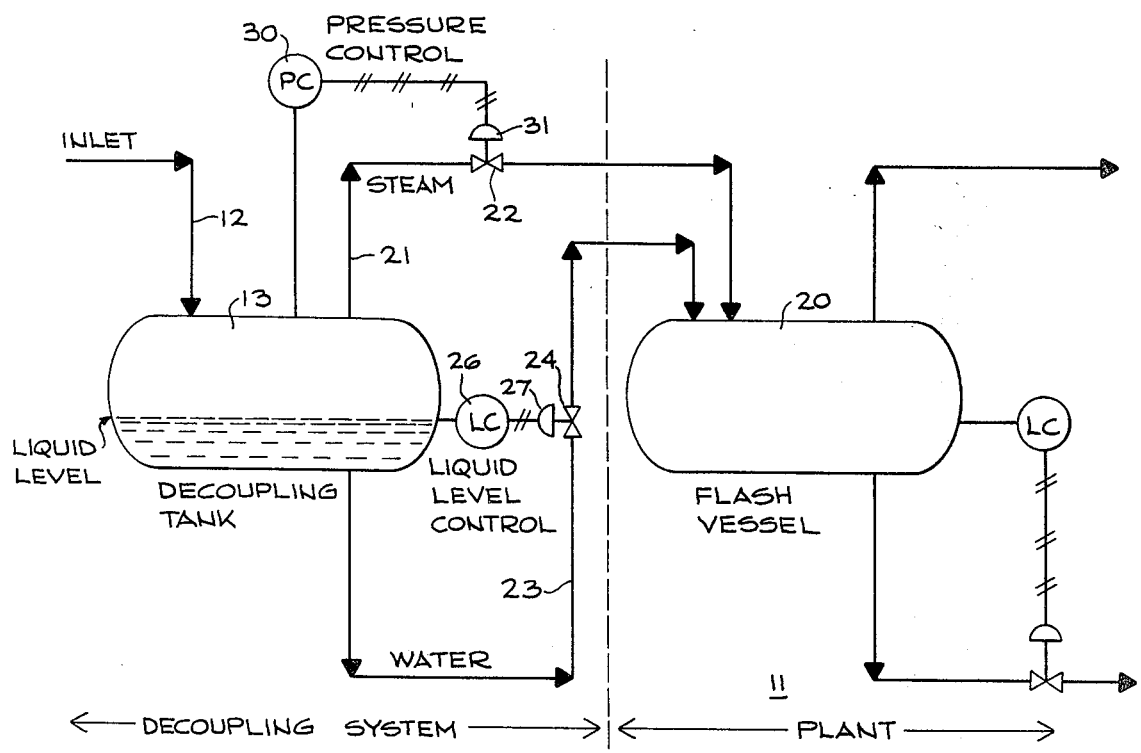
FIG. 2 is a diagram illustrating one embodiment of a decoupling tank as connected to a plant.

In the embodiment illustrated in FIG. 2, the energy use plant 11 has a flash vessel 20 at the input. Steam is connected from the decoupling tank 13 to the vessel 20 through a line 21 having a control valve 22 therein. Water is connected from the tank 13 to the vessel 20 through another line 23 having a control valve 24 therein. The valve 24 is used for controlling the liquid level in the tank. The liquid level is sensed by a conventional level sensor 26 which provides a signal to a valve control unit 27 which in turn controls the valve 24 to maintain the liquid level in the tank 13 at the desired point. The sensor 26, control unit 27, and valve 24 may be conventional in nature.

Steam pressure in the tank 13 is sensed by a steam pressure sensor 30 which provides a control signal to a control unit 31 which in turn controls the valve 22. This combination provides a control for the steam pressure from the tank to the plant. The sensor 30, control unit 31, and valve 22 may be conventional. The embodiment of FIG. 2 may be operated to provide a substantially constant steam pressure to the plant and/or to provide a substantially constant liquid level in the tank. Alternatively, the system may be operated to provide a substantially constant rate of flow of steam or a substantially constant rate of flow of water or a substantially constant ratio of water to steam rates of flow, as desired, for input to the particular type of plant which is using the thermal energy. The decoupling tank should have steam volume capacity sufficiently large to smooth steam pulses in the incoming two-phase flow. The tank should also have a sufficiently large liquid capacity and liquid surface area to smooth the liquid flow at the inlet, so that all the variations are substantially eliminated.

The embodiment of FIG. 2 controls surging by providing liquid and vapor capacity and by providing separate liquid and vapor lines to the first stage flash vessel 20 of the plant 11. Liquid flow from the tank to the flash vessel is controlled by a level control valve on the tank level. The combination of liquid capacity in the tank and the proper setting of throttling range on the control valve and controller actions will substantially eliminate liquid flow variation to the flash vessel. Steam flow from the tank to the flash vessel is controlled by a pressure control valve on tank pressure. Variations in steam flow will be dampened by the vapor capacities of both the tank and flash vessel and by proper settings of the throttling range and controller actions. The volume of the tank is determined by the size and frequency of the surges in the water supply to the tank. The combination of a decoupling tank and the control valves may be referred to as a decoupling system, which delivers steady uniform flows of steam and liquid under controlled conditions.

Figure 3:
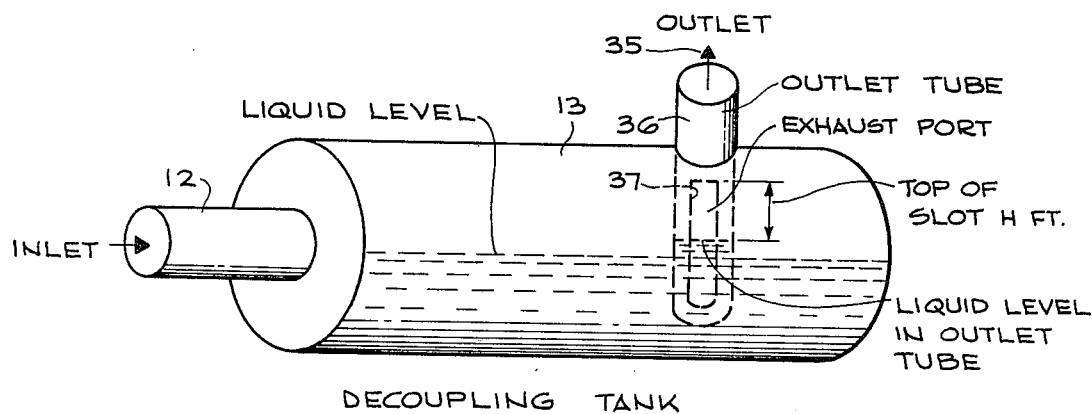
FIG. 3 is a view similar to that of FIG. 2 showing another alternative embodiment of the decoupling tank.
Figure 4:
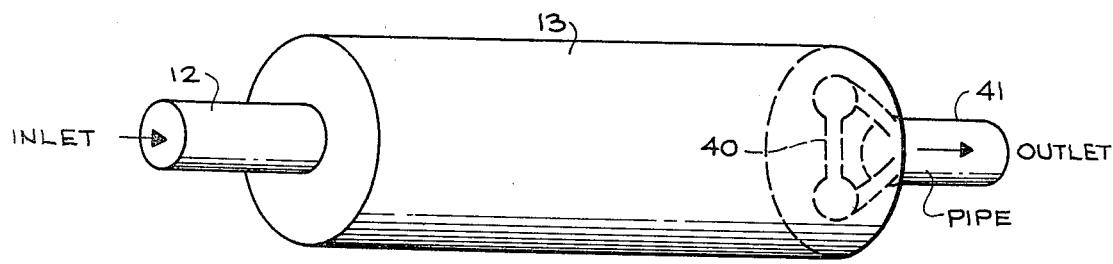
FIG. 4 is a view similar to that of FIG. 2 showing another alternative embodiment of a decoupling tank.

An alternative embodiment for the decoupling tank 13 is shown in FIG. 3, which embodiment has a single outlet line 35 from the tank to the plant. An outlet tube 36 is positioned in a wall of the tank and extends downward in the tank below the liquid level. An outlet slot or exhaust port 37 in the outlet tube 36 extends above and below the liquid level within the tank.

The decoupling tank outlet 35 is directly connected to the plant 11 as shown in FIG. 1. A control valve 18 may be situated in this line but should be as close as possible to the outlet 35 for the reasons noted above. This control valve typically is manipulated so as to maintain a constant pressure, flow rate, or level in the plant or elsewhere as best suited for the plant operations. The decoupling tank and special shaped outlet guarantees steady homogeneous flow to the control valve and steady uniform flow is assured in the short pipeline to the plant. The liquid level in the decoupling tank will be self-seeking so as to maintain the appropriate ratio of liquid to vapor in the outlet according to what is supplied through the inlet.

The outlet slot 37 of the tank of FIG. 3 is designed so that the ratio of liquid-to-gas flow rates in the outlet is constant. The outlet slot operates by high velocity gas sweeping the liquid into the outlet tube, where, in a properly sized slot and tube, flow will be in the mist flow regime. The liquid surface area is minimized by using a shaped outlet port such as the rectangular port shown in FIG. 3. The width of the port is selected so that the height H of the opening for vapor flow is a reasonable maximum. This maximizes the allowable variation in liquid height dH and so minimizes the size of the surge tank.

The worst case the tank must handle is alternating slugs of pure gas and pure liquid at the inlet. During the period of all liquid flow, the gas capacity of the tank is of sufficient size to provide the required gas flow without significant drop in tank pressure. The design equations for such a decoupling tank are set out below.

As shown below, for a typical geothermal well and 50 megawatt (MW) plant flow conditions, which has a 2 phase pipe transmission diameter D of 3 feet, to meet the above requirements, the tank diameter B is given by $$B \geq 3D = 9 \text{ ft.}$$

where the liquid slug volume is assumed to be 3D. This diameter will result in about $\pm 2$ psi maximum pressure swings.

The decoupling tank 13 of FIG. 3 provides
1. gas capacitance,
2. liquid capacitance, and
3. steady and constant outlet vapor to liquid ratio The required gas capacitance V of the decoupling tank is that which limits the pressure fluctuations dP to allowable levels, typically 2% of the total pressure. For a typical liquid slug in the inlet of minimum length 3D, V is given by $$V \geq (\tfrac{3}{4})\pi D^3 x V_s P / dP$$

where x is weight fraction steam, $V_s$ is the steam specific volume, P is the decoupling tank pressure, and D is the inlet pipe diameter. For $x = 0.1$ and 100 pisa steam, and surge tank diameter B and length L, half filled with liquid, $$LB^2 \geq 120 D^3$$

and for $$L/B = 5$$

$$B \geq 3D$$

The design method outlined above for the embodiment of FIG. 3 may also be used for the embodiment of FIG. 2.

The embodiment of the decoupling tank shown in FIGS. 4-7 utilizes a shaped exhaust port or outlet slot 40 for the tank 13 and provides a single outlet line 41 to the plant.

The tank 13 provides capacitance or holdup for the flowing fluid. Two-phase fluid which may be flowing as alternating slugs of liquids and gases or in some other form of nonuniform flow enters the tank. The tank is sized sufficiently large so that the alternating slug of liquid and gases cause the level in the tank to vary less than about $\tfrac{1}{2}$ the tank height; for example, from $\tfrac{1}{4}$ full to $\tfrac{3}{4}$ full. The exhaust slot is shaped so that the ratio of gas to liquid flow rate therethrough is sufficiently constant over the range of liquid levels which occur. Furthermore, the exhaust is shaped so that the ratio of gas to liquid flow rate will adjust to a new constant value as required by the other portions of the process; for example, the well production rate.

Figure 6:
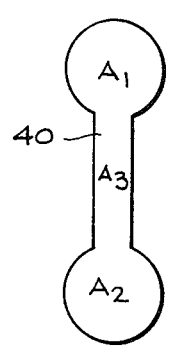
FIG. 6 is an enlarged view of the outlet slot of the tank of FIG. 4.
Figure 7:
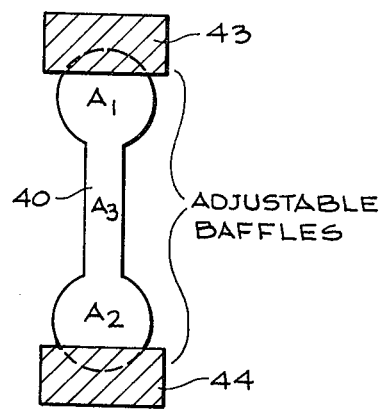
FIG. 7 is a view similar to that of FIG. 6 illustrating baffles for varying the sizes of the outlet slot.

The exhaust entry cross section is characterized by three areas as shown in FIG. 6. The areas $A_1$ and $A_2$ carry the majority of the gas and liquid flows, respectively. The ratio of $A_1$ to $A_2$ is set so that the gas and liquid flow through each, respectively, at approximately the same pressure drop. The area $A_3$ is sized to handle the variation in gas to liquid flow rate ratio expected. Should extraordinarily large variation in flow rate be expected, or should there be need for finer control, adjustable openings can be provided by baffles 43, 44 (FIG. 7), which baffles may be adjustably mounted on the tank. The area $A_3$ is characterized by a long narrow shape such as the rectangular one shown.

The length to width ratio of area $A_3$ is sized so as to maintain the outlet flow rate ratio constant for the expected slug or other nonuniform flow expected. The water level in the tank is self-controlling. If the inlet water-to-steam ratio increases, the water level increases and the outlet water-to-steam rate increases. If the width of the area $A_3$ is reduced to zero, the decoupling tank of FIG. 4 will correspond to that of FIG. 2 with two separate outlets for steam and liquid.

Figure 5:
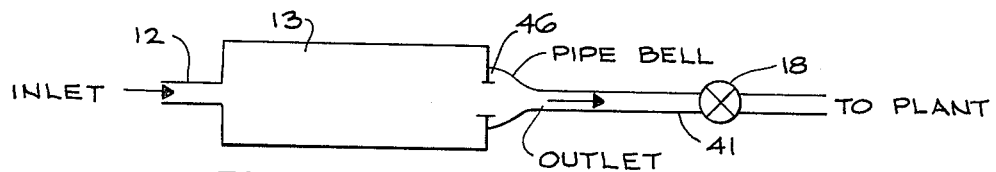
FIG. 5 is a side view of the tank of FIG. 4.

The outlet conduit from the tank can be tapered or enlarged and altered so as to mate with any desired equipment or pipe. It can, for example, empty directly into a pipe reducing section or bell 46 as shown in FIG. 5. The outlet can empty directly into a piece of process equipment or a section of pipe as required by the process plant 11.

As an example of the design of the shaped outlet slot 40, the collective flow from a geothermal well or wells producing five million lbs./hr. of fluid containing 12% by weight steam will be considered. This is sufficient to produce about 50 MW. The five million lbs./hr. will be assumed to be flowing in a 30 inch pipe in slug flow. It is desired to produce a uniform constant quality flow for introduction into a flash scrubber of the energy use plant. Furthermore, it is desired to handle a steam quality varying from 10 to 14%.

The decoupling tank design to accomplish this is:
Vessel length: 14 ft.
Vessel diameter: 7 ft.
Exhaust configuration
$A_1$: 1.6 sq. ft.
$A_2$: 1.8 sq. ft.
$A_3$: 1.2 sq. ft.
$A_3$ to be $\tfrac{1}{3}$ ft. $\times$ 4 ft.

This device will produce a substantially constant quality feed; that is, the quality will be maintained within the range of 11.5 to 12.5% or better, even though the inlet alternately varied from all liquid to all gas flow, i.e., slug flow, with an average quality of 12%.

I claim:
1. A method of transmitting a two phase fluid of water and steam from a geothermal well head to an energy use plant, which comprises:
   introducing the two phase fluid from the well head directly into a pipeline having substantially no flow restrictions;
   conveying the two phase fluid through the pipeline to a decoupling tank adjacent the energy use plant with no pressure or rate of flow controls, substantially no change in slope, and substantially no vertical rises; and
   conveying the water and steam from the decoupling tank to the energy use plant.
2. A method as defined in claim 1 including controlling flow of fluid from the decoupling tank to the en- ergy use plant to provide a substantially constant ratio of water to steam rates of flow.

3. A method as defined in claim 1 including controlling flow of fluid from the decoupling tank to the energy use plant to provide a substantially constant steam pressure to the energy use plant.

4. A method as defined in claim 1 including controlling flow of fluid from the decoupling tank to the energy use plant to provide a substantially constant rate of flow of steam.

5. A method as defined in claim 1 including controlling flow of fluid from the decoupling tank to the energy use plant to provide a substantially constant rate of flow of water.

6. A method as defined in claim 1 including controlling flow of fluid from the decoupling tank to the energy use plant to provide a substantially constant liquid level in the decoupling tank.

7. A method as defined in claim 1 including conveying the water and steam from the decoupling tank to the energy use plant in separate lines.

8. A method as defined in claim 1 including conveying the water and steam from the decoupling tank to the energy use plant in a single line.

* * * * *